(12) United States Patent
Young (10) Patent No.: US 9,883,769 B2
(45) Date of Patent: Feb. 6, 2018

(54) TEMPERATURE CHANGING CONTAINERS (71) Applicant: Forever Young International, Inc., Henderson, NV (US)

(72) Inventor: Daniel L. Young, Henderson, NV (US)

(73) Assignee: Forever Young International, Inc., Las Vegas, NV (US)

( * ) Notice: Subject to any disclaimer, the term of this patent is extended or adjusted under 35 U.S.C. 154(b) by 319 days.

(21) Appl. No.: 14/439,278

(22) PCT Filed: Oct. 29, 2013

(86) PCT No.: PCT/US2013/067299
§ 371 (c)(1),
(2) Date: Apr. 29, 2015

(87) PCT Pub. No.: WO2014/070762
PCT Pub. Date: May 8, 2014

(65) Prior Publication Data
US 2015/0289716 A1    Oct. 15, 2015

Related U.S. Application Data (60) Provisional application No. 61/719,940, filed on Oct. 29, 2012.

(51) Int. Cl.
*A47J 36/28* (2006.01)
*B65D 81/34* (2006.01)
(Continued)

(52) U.S. Cl.
CPC ............ *A47J 36/28* (2013.01); *A47J 27/002* (2013.01); *A47J 36/06* (2013.01); *B65D 25/10* (2013.01);
(Continued)

(58) Field of Classification Search
CPC .... B65D 81/3484; B65D 25/10; B65D 81/38; A47J 27/002; A47J 36/06; A47J 36/28; F25D 5/02
See application file for complete search history.

(56) References Cited

U.S. PATENT DOCUMENTS

| 3,851,788 A | 12/1974 | Hammes |
| 4,002,235 A | 1/1977 | Donnelly |

(Continued)

FOREIGN PATENT DOCUMENTS

| GB | 2414462 | * 11/2006 |
| JP | H01179882 U | 12/1989 |

(Continued)

OTHER PUBLICATIONS

The International Search Report and Written Opinion for related PCT Application No. PCT/US2013/067299 dated Mar. 19, 2014.

*Primary Examiner* — Alfred Basichas
(74) *Attorney, Agent, or Firm* — Troutman Sanders LLP (57) ABSTRACT

Instant temperature changing device includes reactant and activator liquid that generate an exothermic or endothermic chemical reaction when combined to heat or cool contents in the device. One temperature changing device includes an inner shell and an outer shell, an activator container, and a reaction chamber. Opening the activator container causes reactant to combine with activator liquid and undergo an exothermic or endothermic reaction to initiate heat transfer to or from the contents disposed in the inner shell.

20 Claims, 8 Drawing Sheets

(51) Int. Cl.
*A47J 27/00* (2006.01)
*A47J 36/06* (2006.01)
*B65D 25/10* (2006.01)
*B65D 81/38* (2006.01)
*F25D 5/02* (2006.01)

(52) U.S. Cl.
CPC ......... *B65D 81/3484* (2013.01); *B65D 81/38* (2013.01); *F25D 5/02* (2013.01)

(56) References Cited

U.S. PATENT DOCUMENTS

| | | |
|---|---|---|
| 4,510,919 A | 4/1985 | Benmussa |
| 2005/0279106 A1 | 12/2005 | Leonzo et al. |
| 2007/0125362 A1 | 6/2007 | Ford et al. |
| 2007/0163569 A1 | 7/2007 | Strachan |
| 2008/0017184 A1 | 1/2008 | Marshall et al. |
| 2012/0181284 A1 | 7/2012 | Young |
| 2012/0186141 A1 | 7/2012 | Young |

FOREIGN PATENT DOCUMENTS

| | | |
|---|---|---|
| KR | 20090106326 A | 10/2009 |
| WO | 2010059636 A2 | 5/2010 |

\* cited by examiner

TEMPERATURE CHANGING CONTAINERS

CROSS-REFERENCE TO RELATED APPLICATIONS

This application is a United States national stage entry of an International Application serial no. PCT/US2013/067299 filed Oct. 29, 2013 which claims priority to U.S. provisional patent application No. 61/719,940 entitled "Instant Heat Transfer Containers" and filed Oct. 29, 2012. The contents of these applications are incorporated herein by reference in their entirety as if set forth verbatim.

FIELD

The embodiments disclosed herein relate generally to temperature changing containers (i.e. containers that instantly self-heat and/or self-cool), and in particular to temperature changing containers for dispensing instantly heated or cooled contents.

BACKGROUND

One problem with most beverages, ready-to-eat foods, and other products that require heating or cooling is that they are not ready for consumption straight out of the container (e.g. they are not heated or cooled). Rather, they must be heated or cooled by external means. In the context of heated foods, although instant teas or soups can be heated by adding hot or boiling water to the container, this assumes that the user has access to a supply of hot water. Many times this is simply not true. For example, the user may be outdoors or otherwise without access to microwaves, stoves, electricity, fuel or other external power means. Further, in emergency situations, instant access to heated beverages, food or other products may be vital to survival such as delivery of certain drugs, wax, cosmetics, massage oils, and commercial glues such as resins and epoxies.

To solve the various problems outlined above, many solutions have been proposed. For example, temperature changing hot beverages and soups have been provided in which the outer container includes an inner contents chamber (to hold the beverage, soup or other contents to be heated), a quick-lime chamber, and a water chamber. The user causes the water chamber to communicate with the quick lime chamber, and the combination of water and quick-lime gives rise to a fast exothermic reaction (for example, see U.S. Pat. No. 7,117,684 to Scudder et al.). While these known hot containers provide the user with heated contents, they have drawbacks. First, the quick-lime and water reaction completes very quickly so that although the contents are initially hot, they cool down as soon as the exothermic reaction completes, which may be only a few minutes. Second, the quick-lime exothermic reaction is extremely hot and can lead to contents that are dangerously hot thus requiring a container that can withstand extremely high temperatures. Finally, the quick-lime and water combination creates a hot slurry that can easily leak out of the container and cause burns, unless a complicated one-way valve is provided that allows gas to escape but keeps the slurry inside the reaction area of the container.

Another significant problem with known instant self-heating containers is that the heated slurry tends to only contact the bottom of the contents chamber so that the contents at the bottom of the contents chamber are initially much hotter than the contents at the top of the chamber. Where the contents are dispensed from the top of the outer container, this means that the contents that leave the container first are coolest, while the hottest contents remain at the bottom of the contents chamber.

Accordingly, it would be advantageous to provide a temperature changing food and beverage container that has its own long-lasting heat generation source so that the beverage, food, medication, or other products requiring heated or cooled temperatures can be maintained at a relatively constant elevated or depressed temperature for a relatively long duration of time. It would also be advantageous to provide a temperature changing container that can be made from relatively inexpensive, disposable materials.

Another problem with known temperature changing containers is that the exothermic or endothermic reaction occurs all at once. There is a need for a temperature-changing container that allows the user to modulate the chemical reaction over time, thereby enabling the user to control the duration and/or intensity of the reaction.

Finally, another problem with containers for releasing one initially segregated reactant into contact with another reactant is ensuring complete release of the segregated reactant. When initially contained within a chamber sealed by a membrane, known containers generally create a small puncture or tear in the membrane. If this puncture or tear is small, the reactant inside can easily clog the opening and prevent rapid and complete release of the reactant. Accordingly, there is a need for a temperature changing container with an internal segregated reactant that rapidly and completely releases the reactant when desired by a user, that sequesters the reactants, and that provides for efficient heat transfer using conduction and convection.

SUMMARY

The temperature changing device and container disclosed below satisfy these needs. The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one embodiment, a temperature changing container includes a main container with a side wall, a thermally conductive lower wall, and containing contents targeted for temperature changing. A sealed activator container is formed under the main container and contains an activator liquid. The activator container has a thermally conductive upper wall and at least one opening sealed by a membrane. In certain embodiments, the membrane may be operatively coupled to an activation tab that extends out of the container through an activation aperture. An outer shell is nested externally with the main container and thereby forms a reaction chamber that is disposed beneath and adjacent to the activator container. A reactant is disposed in the reaction chamber beneath the activator container. In this embodiment, pulling on the activation tab opens the membrane and unseals the activator container to expose the activator liquid to the reaction chamber to undergo a reaction with the reactant and change the temperature of the contents in the main container.

The membrane may form a lower wall of the activator container. The thermally conductive lower wall of the main container may be the same structure as the thermally conductive upper wall of the activator container. Further, the main container and the activator container may be both integrally formed parts of an inner shell nested internally with the outer shell. The thermally conductive lower wall of the main container may include a thermally conductive first material such as a metal. In other embodiments, the side walls of the main container are also thermally conductive and constructive from the same or similar materials.

The main container may be a cup inserted into an open upper end of the outer shell to form the reaction chamber in the outer shell beneath the activator container. The main container may be constructed from aluminum. The activator liquid in the activator container may be a liquid that is deposited directly onto the reactant in the reaction chamber when the membrane is opened by pulling on the activation tab. The activator in the activator container may also be a powder encased in a permeable sachet, and the reactant may be a liquid in the reactant chamber that wicks into the permeable sachet when the membrane is opened by pulling on the activation tab. The sachet may include a first portion with high absorbency and low gas permeability and a second portion with low absorbency and high gas permeability. The activator and the reactant may undergo an exothermic or endothermic reaction that causes the temperature of the contents in the main container to change (i.e. heat up or cool down).

In another embodiment, a temperature changing container includes an inner shell with a main container containing contents targeted for temperature changing. An outer shell is externally nested with the inner shell and includes an internal peripheral shoulder forming a reactant chamber at the lower end of the outer shell. A membrane is adhered to or integrally formed with the internal peripheral shoulder of the outer shell to hermetically seal the reactant chamber. A reactant is disposed inside the reactant chamber and an activator liquid is disposed inside the outer shell outside the inner shell and above the membrane. Opening the membrane permits the activator liquid to flow into the reactant chamber and intermix with the reactant to cause an exothermic or endothermic chemical reaction that transfers heat to or from the contents targeted for heat transfer in the main container.

The membrane may include a pre-weakened failure region to facilitate opening the membrane and thus unsealing the reactant chamber. In one embodiment, a pull tab having a first portion is adhered to the membrane and a second portion extends out of the temperature changing container through an aperture. In this embodiment, pulling on the pull tab causes the membrane to fail in the pre-weakened failure region thereby opening the membrane and causing the reactant chamber to permit ingress of activator and thus, a temperature changing endothermic or exothermic reaction.

In other embodiments, the inner shell is vertically slidable relative to the outer shell and may include a plunger at the lower end of the main container. Consequently, the temperature changing container is activated by sliding the first and outer shell toward each other causing the plunger to move toward the membrane and rupture the membrane in the pre-weakened failure region. The inner shell may include a first peripheral flange and the outer shell may include a second peripheral flange. A compressible gasket may be disposed between the first peripheral flange and the second peripheral flange. Sliding the first and outer shell toward each other compresses the compressible gasket between the first peripheral flange and the second peripheral flange to permit the plunger to slide toward and rupture the membrane in the pre-weakened failure region.

A removable rigid locking member may be disposed between the first peripheral flange and the second peripheral flange to prevent vertical sliding of the inner shell toward the outer shell when the locking member is installed. The compressible gasket may have a cross-sectional profile that forms a channel with which the locking member engages.

In other embodiments, a temperature changing device comprises an inner shell having at least one wall. The inner shell is configured to hold contents to be heated or cooled, wherein the at least one wall of the inner shell is thermally conductive. An activator container disposed adjacent to the inner shell, wherein the activator container may be sealed and comprises an activator liquid. An outer shell is nested externally with the inner shell to form a reaction chamber between the activator container and the inner shell. The reaction chamber comprises a reactant. A membrane seals at least one opening between the activator container and the reaction chamber, wherein the activator container is opened to release the activator into the reactant chamber. Opening the membrane unseals the activator container causing the activator liquid to contact the reactant to initiate a temperature changing reaction that produces a gel. The gel expands between the outer shell and the inner shell. The gel also produces steam causing heat to be transferred conductively and convectively to the contents disposed inside the inner shell. The steam escapes from the temperature changing device but the gel does not escape therefrom.

In some embodiments, the membrane may form a lower wall of the activator container. All walls of the inner shell may be thermally conductive. Likewise, all walls of the outer shell may be thermally insulative. The activator container and the inner shell may be integrally formed together. In this embodiment, the temperature changing device may comprise an activation aperture with an activation tab extending therethrough. The activation tab is mechanically connected to the membrane such that pulling the activation tab opens the membrane and unseals the activator container. The inner shell may comprise two or more materials which can be a metal and a polymer.

In other embodiments, the inner shell is configured to receive a contents container that comprises contents to be heated or cooled. The contents container contains contents to be heated such as food, beverage, or medication. The contents container is inserted into an open upper end of the inner shell, wherein the reaction chamber is disposed beneath the inner shell and the activator container. The contents container may be an aluminum cup. In this embodiment, the activator liquid may be deposited directly onto the reactant in the reaction chamber when the membrane is opened. The reactant may be a powder encased in a permeable sachet, wherein the activator liquid is a liquid that wicks into the permeable sachet when the membrane is opened. The sachet may comprise a first portion with high absorbency and low gas permeability and a second portion with low absorbency and high gas permeability.

In some embodiments, the device is configured so that the reactant and the activator liquid undergo an exothermic reaction such that heat generated by the exothermic reaction is transferred convectively and conductively to the contents of the inner shell thereby increasing the temperature of the contents in the contents container. In other embodiments, the reactant and the activator liquid undergo an endothermic reaction such that heat generated by the endothermic reaction is transferred convectively and conductively to the contents of the inner shell thereby decreasing the temperature of the contents in the contents container.

In those embodiments with the activation tab, the activation aperture may be a vent to release steam that is generated in the temperature changing reaction. The vent may comprise a diameter with a size that is manually or automatically adjustable.

In some embodiments, the outer shell may comprise an internal peripheral shoulder that forms the reactant chamber beneath the inner shell. The membrane may adhere to the internal peripheral shoulder of the outer shell causing the reactant chamber to hermetically seal. The membrane may comprise a pre-weakened failure region. The membrane may further comprise a dump valve to facilitate opening the membrane. In those embodiments with a pull tab, pull tab may have a first portion adhered to the membrane and a second portion that extends out of the temperature changing device through an aperture. Pulling on the pull tab causes the membrane to fail in the pre-weakened failure region causing the membrane to open and unseal the reactant chamber to permit ingress of the activator liquid.

The inner shell may comprise a lower end and a plunger disposed on the lower end. In this embodiment, the inner shell is vertically slidable relative to the outer shell such that the device is activated by sliding the inner shell towards the outer shell causing the plunger to rupture the membrane in the pre-weakened failure region.

In other embodiments, the device may comprise a first peripheral flange disposed on the inner shell. A second peripheral flange may be disposed on the outer shell and a compressible gasket may be disposed between the first peripheral flange and the second peripheral flange. Accordingly, sliding the inner shell towards the outer shell compresses the compressible gasket between the first peripheral flange and the second peripheral flange. Further, compressing the compressible gasket causes the plunger to slide toward and rupture the membrane in the pre-weakened failure region. A removable locking member may be disposed between the first peripheral flange and the second peripheral flange that prevents vertical sliding of the inner shell toward the outer shell when the locking member is in place. The compressible gasket may have a a cross-sectional profile that forms a channel such that the locking member is engageable with the channel of the compressible gasket. A detachable lid may be present in those embodiments where the inner shell and the outer shell each comprise an associated top section. The detachable lid is configured to seal each of the associated top sections.

In other embodiments, an elongated member may be mechanically connected to the activator container and extend from the activator container towards the top section of the inner shell. The elongated member may also extend above the top section of the inner shell until it is flush with the top section of the outer shell. Accordingly, the top section of the outer shell may be situated above the top section of the inner shell. However, the elongated member may not extend to the extent it is situated above the upper section of the outer shell. A piercer may be disposed underneath the activator container so that when the membrane is disposed underneath the activator container, the piercer is configured to pierce the membrane. Accordingly, applying downward pressure to the top of elongated member causes the activator to slide toward the pierce causing the piercer to pierce, unseal, or otherwise open the membrane and open the activator container. A contents container may be inserted into inner shell, wherein the contents container may contain contents to be heated.

A gap may exist between a hole through which the elongated member extends in the top section of the inner shell so that the gap permits steam that is generated by the gel to escape. In other embodiments, the vent that is entirely independent from the elongated member is disposed on the top section of outer shell. The vent is configured to allow the steam produced by the gel to escape and not an opening that may exist as a result of the plunger. A detachable base may be included in embodiments where the inner shell and the outer shell each comprise an associated base section. Accordingly, the detachable base is configured to seal each of the associated base sections. Attaching the detachable base to the outer shell and the inner shell causes the reaction chamber to be formed. In some embodiments, a contents container may also be inserted through the underside of outer shell and/or inner shell before the detachable base mechanically attaches to the temperature changing device. In other embodiments, the lid is configured to seal the outer shell and/or the inner shell and the lid is detachable.

To the accomplishment of the foregoing and related ends, certain illustrative aspects are described herein in connection with the following description and the appended drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

The embodiments disclosed below address a need for a relatively inexpensive temperature changing device that remains at an elevated or reduced temperature for a relatively long duration of time. In one embodiment, a temperature changing device includes an activator liquid and reactant that generate an exothermic or endothermic reaction when combined to heat or cool contents in the device. One temperature changing device includes an inner shell, an outer shell, an openable activator container and a reaction chamber. Opening the activator container causes the reactant and activator liquid to combine and undergo an exothermic or endothermic reaction to initiate heat transfer to or from contents disposed in the inner shell. In some embodiments, the temperature changing device is configured to carry out both exothermic and endothermic reactions.

Throughout the following disclosure, various embodiments may be referred to as "self-heating" or "self-cooling" or "temperature-changing." It is to be understood that this terminology is not intended to be limiting and is used only refer to exemplary heat transfer containers. For example, the same structure disclosed for an "self-heating" container may be used in an "self-cooling container." Whether the container is self-heating or self-cooling depends on the activator and reactant used in the chemical reaction, and not on the structure of the container. Thus, an embodiment referred to as a self-heating container or device may also be used as a self-cooling container or device by simply using different activator and/or reactant.

Figure 1:
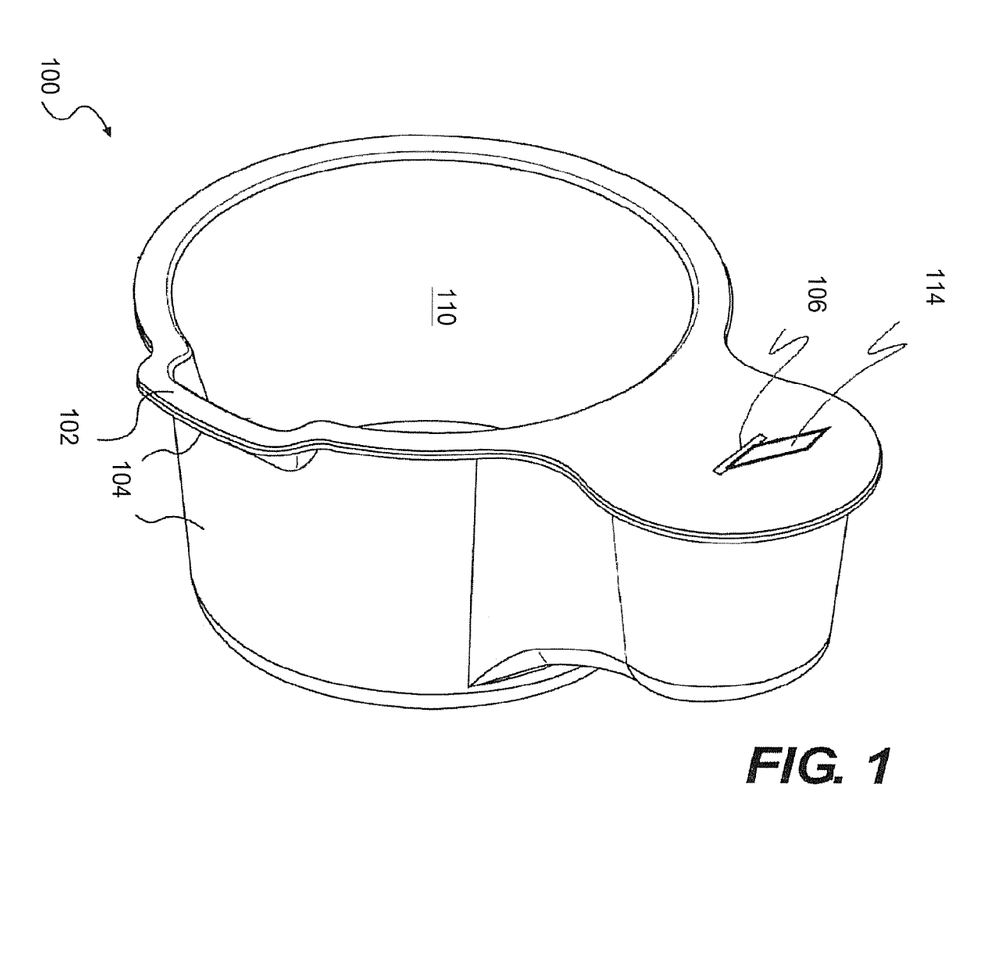
FIG. 1 is a perspective view of one embodiment of a temperature changing device.
Figure 2:
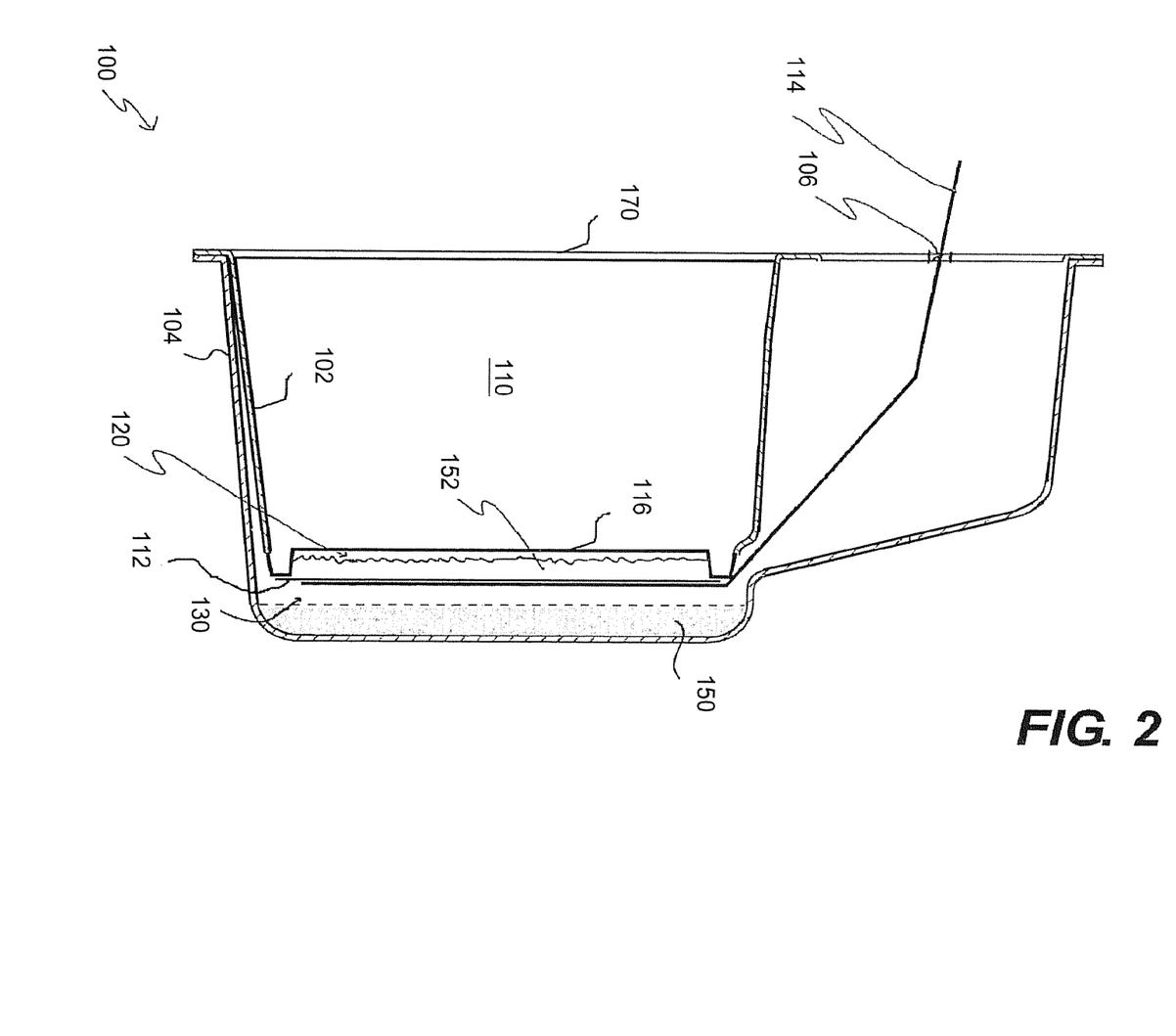
FIG. 2 is a front cross-sectional view of the temperature changing device of FIG. 1.

A first embodiment of a temperature changing device is shown in FIGS. 1 and 2. Temperature-changing device 100 is formed by inner shell 102 which is nested inside outer shell 104. Inner shell 102 includes main container 110, which contains the contents to be heated or cooled, activator container 120 which is adapted to contain activator liquid 152, and vent 106. In some embodiments, contents are added to main container 110 prior to heating or cooling. In this embodiment, activator container 120 is integrally formed into the bottom of inner shell 102 so that thermally conductive upper wall 116 is both the bottom wall of main container 110 and the top wall of activator container 120. In some embodiments, all walls of inner shell 102 are thermally conductive. Outer shell 104 is nested outside inner shell 102 with the bottom surface of main container 110 spaced above the bottom surface of outer shell 104. This space between the bottom of target container 110 and the bottom of outer shell 104 forms reaction chamber 130, in which reactant 150 is disposed.

The bottom wall of activator container 120 is formed by membrane 112. Membrane 112 is constructed from materials such as laminated film, polyethylene, polyester, aluminum, and/or some combination of the like. In this embodiment, membrane 112 operatively connects to pull tab 114 such that membrane 112 is openable by pulling or moving the pull tab 114. As to the pull tab 114 specifically, one portion of it is attached to membrane 112 and another portion of it extends up through vent 106 where it is accessible to a user. Membrane 112 may be formed with pre-etched tear lines that rupture when pull tab 114 is pulled or moved from outside the container 100. Similarly, pulling on pull tab 114 may cause membrane 112 to peel open so as to partially or completely remove the bottom wall of activator container 120. Whatever the activation mechanism, pulling on pull tab 114 results in opening the bottom of activator container 120 thereby releasing activator liquid 152 into reaction chamber 130 where it initiates an exothermic or endothermic reaction with reactant 150. In some embodiments, since activator container 120 is disposed directly above reactant 150 and reaction chamber 130, pulling on pull tab 114 to open membrane 112 causes activator liquid 152 to instantly and completely intermix with reactant 150, thereby ensuring an immediate and uniform chemical reaction that heats or cools the targeted contents of main container 110, for example a food, beverage, medication or aromatherapy liquid.

Reactant 150 may be a loose powder disposed in reaction chamber 130, and may be intermixed with a super absorbent powder that forms a gel when combined with activator liquid. In certain embodiments, the gel is "swellable" such that it expands as the reactant and the activator liquid react. In some embodiments, reactant 150 is disposed in a permeable sachet or teabag that is saturated with activator liquid 152 when activator container 120 is opened.

In some embodiments, the upper end of main container 110 is sealed by a membrane or lid 170. In this embodiment, pull tab 114 may extend through an aperture 106 in this membrane 170 that serves as a vent after activation of the temperature changing reaction. Prior to activation, the aperture 106 is hermetically sealed, for example by an adhesive strip at the outer end of pull tab 114. In other embodiments, aperture 106 is hermetically sealed by thermal weld, sonic weld, or activated sealant. In some embodiments, the aperture 106 functions as a vent that allows steam that is generated in the reaction to be released or regulated while in other embodiments, the aperture 106 does not function as a vent.

Figure 3:
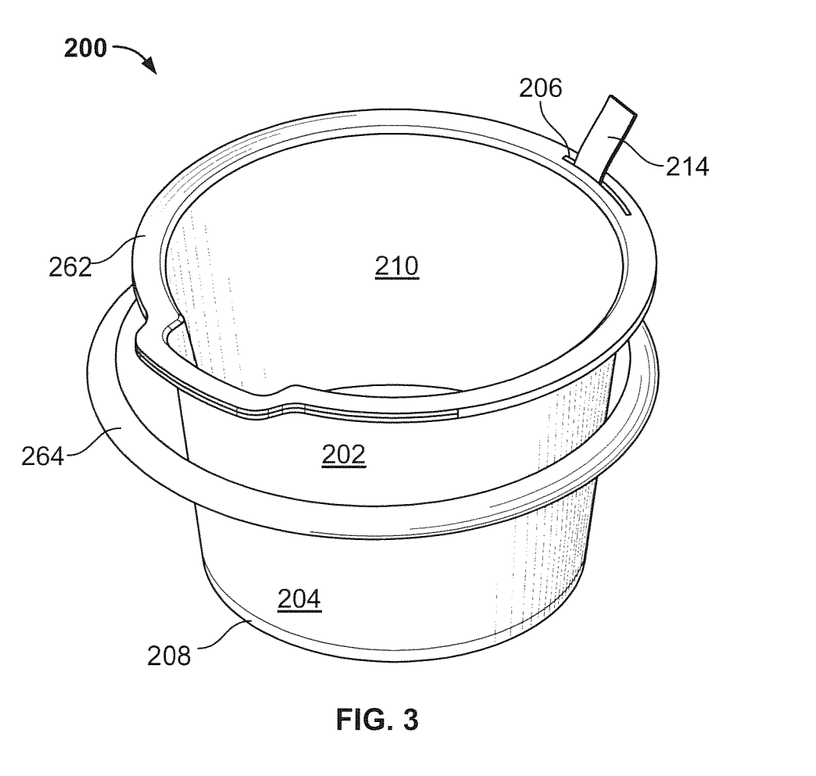
FIG. 3 is a perspective view of another embodiment of a temperature changing device.
Figure 4:
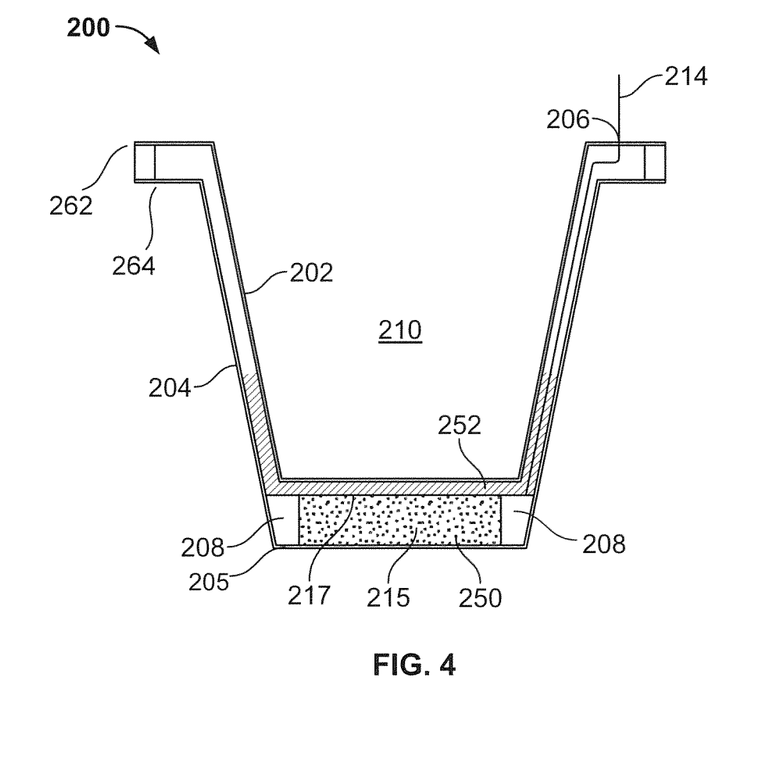
FIG. 4 is a front cross-sectional view of the temperature changing device of FIG. 3.

Another embodiment of a temperature changing container 200 is shown in FIGS. 3 and 4. Temperature changing container 200 includes inner shell 202 nested inside outer shell 204. Inner shell 202 includes main container 210 which contains contents targeted for heat transfer. Inner shell 202 and/or outer shell 204 may include a pour spout to facilitate consumption or transfer of liquid contents in main container 210. Outer shell 204 includes peripheral shoulder 208 which, if heat transfer container 200 is round, is an annular shoulder. The portion of the interior of outer shell 204 between bottom wall 205 and peripheral shoulder 208 is reactant chamber 215 in which reactant 250 is disposed. Membrane 217 adheres to the upper surface of peripheral shoulder 208 to hermetically seal reactant 250 inside reactant chamber 215. Membrane 217 is adhered through a thermal weld, sonic weld, radiofrequency weld, or glue. Activator liquid 252 is disposed in the space between inner shell 202 and outer shell 204 above membrane 217.

To activate temperature changing container 200, an activation mechanism is provided to open membrane 217 and cause activator liquid 252 to flow into reactant chamber 215 and intermix with reactant 250. This intermixing initiates an exothermic or endothermic reaction that transfers heat to or from the contents of main container 210.

In some embodiments where water is the activator liquid, endothermic reactions are achieved by mixing the water with ammonium nitrate or potassium chloride which has a cooling effect. Accordingly, using a reactant such as ammonium nitrate or potassium with water causes an endothermic reaction to provide the desired cooling effect.

One contemplated activation mechanism is to attach or integrally form pull tab 214 to membrane 217. For example, membrane 217 may include a pre-etched or otherwise pre-weakened region to which pull tab 214 is attached. In other embodiments, membrane 217 is pre-weakened with a laser or a crush-cut. Pull tab 214 may include an elongate strip extending outside of container 200 through vent 206. Pull tab 214 may further include an adhesive strip to hermetically seal vent 206 prior to activation of the exothermic or endothermic reaction. To activate container 200, a user may pull on the elongate strip of pull tab 214 to shear, rupture, unpeel or otherwise open membrane 217 to allow activator 252 to flow into reactant chamber 215.

Figure 5:
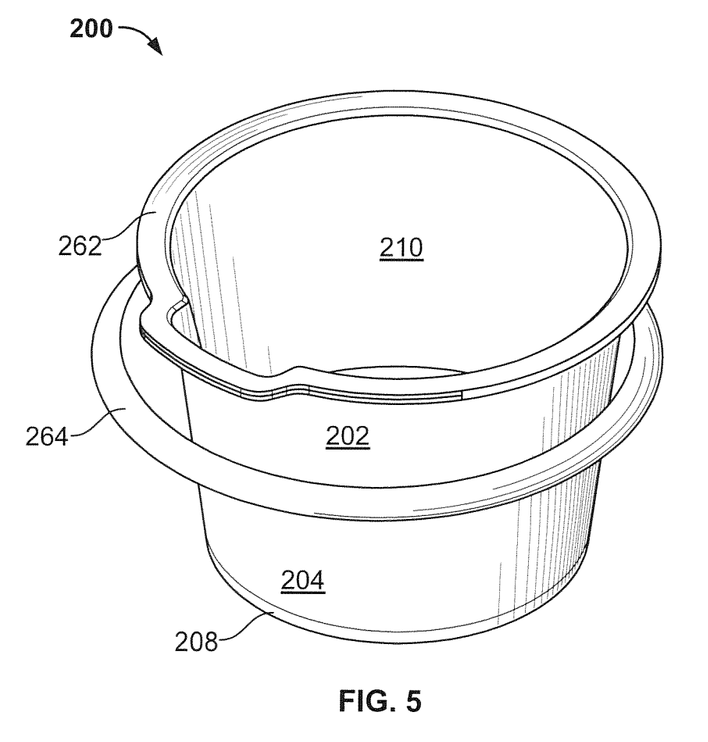
FIG. 5 is a perspective view of another embodiment of a temperature changing device.
Figure 6:
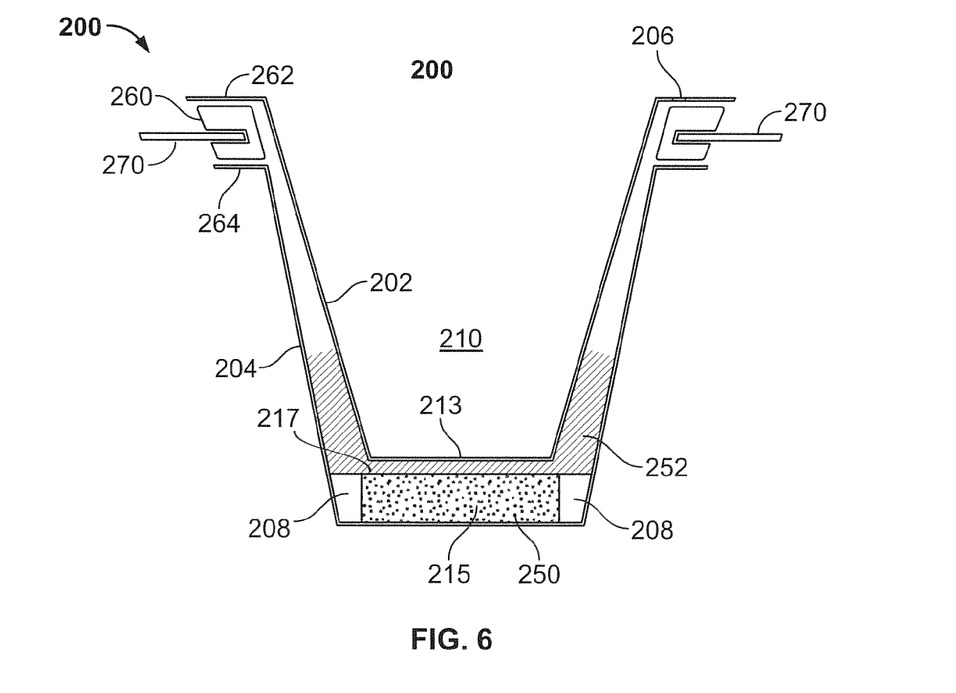
FIG. 6 is a front cross-sectional view of the temperature changing device of FIG. 5.
Figure 6A:
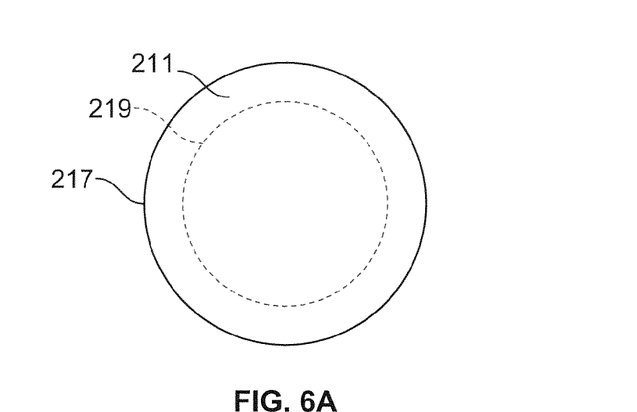
FIG. 6A is a top plan view of a membrane with dump valve for use with the embodiment of FIG. 5.

Another type of activation mechanism for temperature changing container 200 is shown with reference to the embodiment of FIGS. 5 and 6. In this embodiment, inner shell 202 is slidably nested with outer shell 204 so that inner shell 202 can slide vertically relative to outer shell 204. Membrane 217 includes dump valve 219 which can be a frangible or pre-weakened peripheral feature 211 such as an annular laser etching. The bottom of main container 210 includes plunger 213 which is essentially the flat bottom surface of main container 210 dimensioned to be slightly smaller than pre-weakened peripheral feature 211. In other embodiments, plunger 213 is instead a surface that is corrugated or has castellations. Pushing down on inner shell 202 causes inner shell 202 to slide vertically downward relative to outer shell 204 causing plunger 213 to press against pre-weakened peripheral feature of membrane 217. When plunger 213 presses against pre-weakened peripheral feature, this causes membrane 217 to rupture or open and permits activator liquid 252 to flow into reactant chamber 215 and intermix with reactant 250. In other embodiments, the membrane 217 is instead sheared away, ripped, or torn. At least one vent 206 may be provided and configured to permit venting of any pressurized gases generated by the reaction between reactant 250 and activator liquid 252. Vent 206 may be an aperture in a wall of outer shell 204 including an upper wall. In some embodiments, the size of vent 206 is adjustable at manufacturing or alternatively, the vent 206 is adjustable by the user. This allows the user to regulate how much vapor escapes from the container 200 thereby controlling performance of the heated contents disposed therein including heated or cooled temperature, duration that the contents remain heated or cooled, and how many vapors (including therapeutic vapors) are emitted for the benefit of the user.

To permit a small amount of vertical sliding of inner shell 202 relative to outer shell 204, compressible gasket 260 is provided. Inner shell 202 and outer shell 204 both have peripheral flanges (262 and 264 respectively) at their upper ends. Compressible gasket 260 is disposed between and optionally adhered to peripheral flange 262 of inner shell 202 and/or peripheral flange 264 of outer shell 204. Compressible gasket 260 forms a hermetic seal between inner shell 202 and outer shell 204. To activate container 200, a downward force is applied to inner shell 202 which causes compressible gasket 260 to compress thereby permitting plunger 213 (the lower wall of the inner shell) to rupture membrane 217.

If container 200 is round, then peripheral flanges 262 and 264 are annular flanges and compressible gasket 260 is an annular gasket. In this embodiment, compressible gasket 260 may have a generally U- or C-shaped cross-sectional profile with a central generally vertical portion and lower and upper generally horizontal portions. Pressing down on inner shell 202 causes compressible gasket 260 to compress against peripheral flange 264 and/or bend along its vertical portion to permit downward sliding movement of inner shell 202 relative to outer shell 204 at least until it ruptures the membrane 117.*f*

Another type of compressible gasket 260 is a strip with elongate peripheral adhesive portions and an elongate central non-adhesive portion. Strip 260 is constructed from tape or other laminated material. A first elongate adhesive portion is adhered to inner shell 202 and the second elongate adhesive portion is adhered to outer shell 204 so that the non-adhesive portion covers the junction between inner shell 202 and outer shell 204. First elongate adhesive portions is adhered through tape or other adhesives constructed from laminated materials, glues, resins, epoxies, heat seal pressure mechanisms, and the like. When inner shell 202 is slid vertically downwards relative to outer shell 204, the non-adhesive portion of the strip bows outward to accommodate downward relative movement of inner shell 202. The adhesive portions forms hermetic seals with the first and outer shells respectively so that activator enclosed between the two shells cannot escape.

To prevent unintentional activation of container 200 during shipment or storage, locking member 270 is provided between first and second peripheral flanges 262 and 264. If container 200 is round, locking member 270 may be an annular ring or partial ring (i.e. circular but not a complete circle, such as 90% of a circle). If compressible gasket 260 has a U- or C-shaped cross-sectional profile, locking member may be dimensioned to mate or engage with the groove or channel formed by the horizontal and vertical portions of the cross-section of compressible gasket 260.

Locking member 270 is rigid so that compressive force between first and second peripheral flanges 262 and 264 is supported by locking member 270 and prevents any vertical sliding of inner shell 202 relative to outer shell 204. When container 200 is ready for activation, the user removes locking member 270, which may be flexible (but not significantly compressible) to permit pulling locking member 270 open to release it. Locking member 270 therefor is not compressible to the extent that when compressed, it causes the dump valve disposed below to be pierced.

Figure 7:
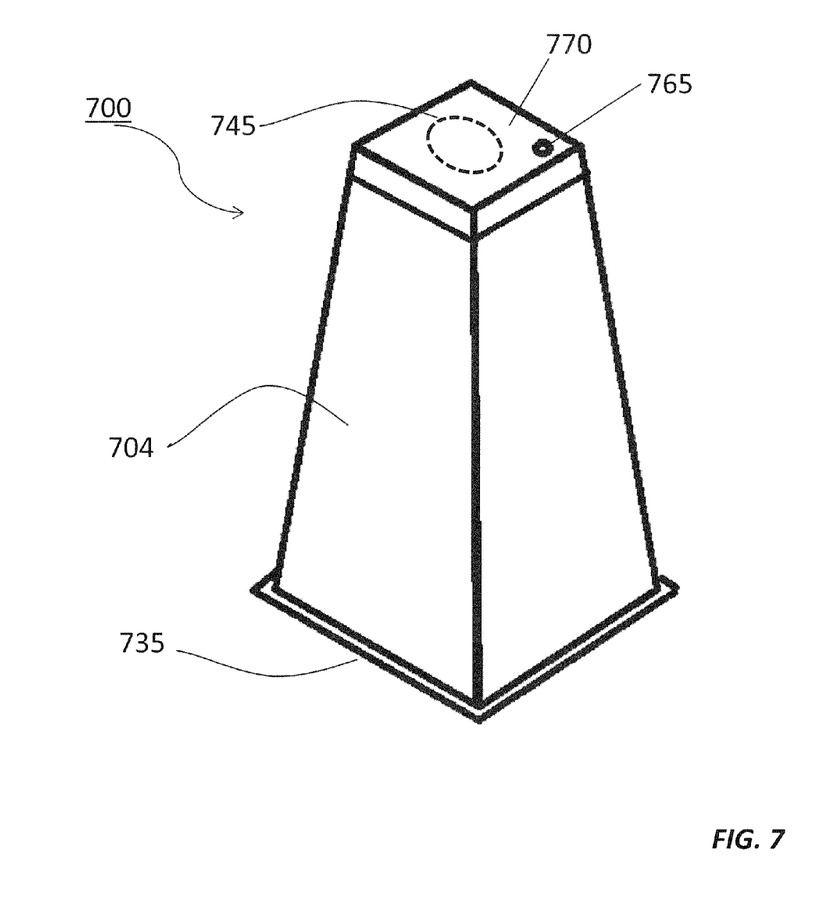
FIG. 7 is a perspective view of another embodiment of a temperature changing device.
Figure 8:
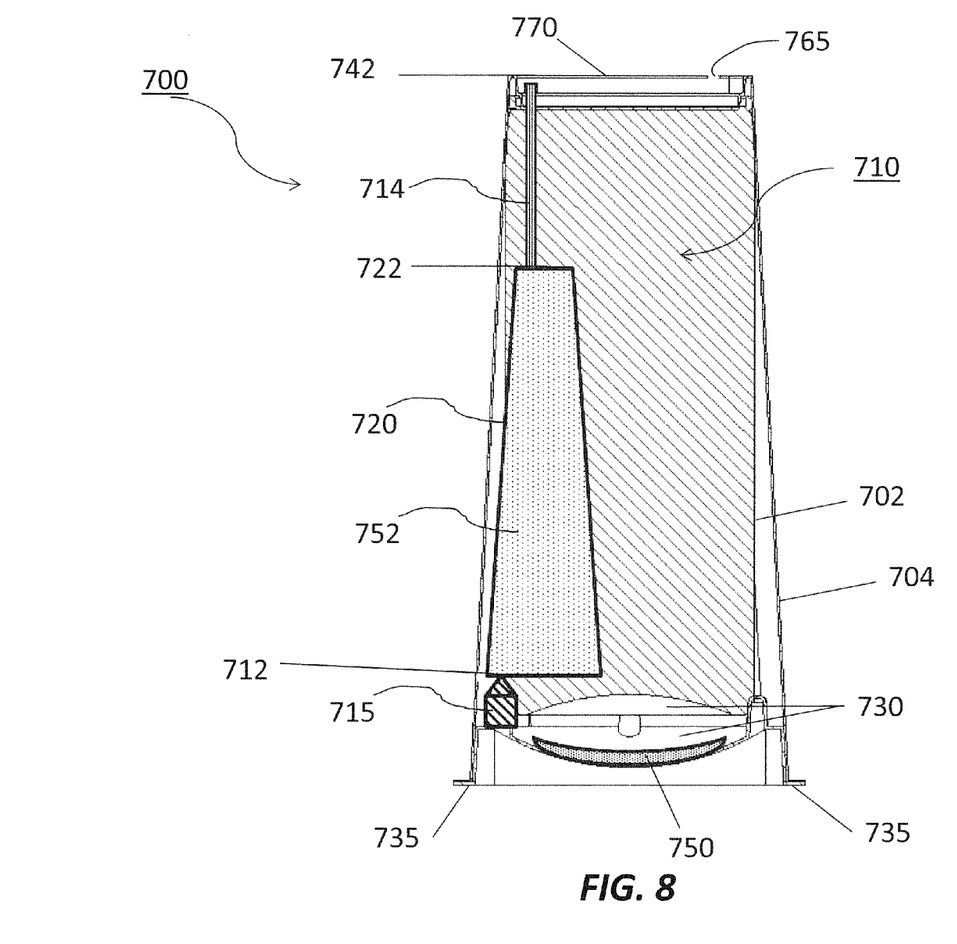
FIG. 8 is a front cross-sectional view of the temperature changing device of FIG. 7.

Another type of temperature changing container 700 is shown with reference to the embodiment of FIGS. 7 and 8. In this embodiment, outer shell 704 is shown seated on top of base 735. Base 735 is configured with a peripheral support flange but in other embodiments this support flange is not included. In certain embodiments, the base 735 of outer shell 704 is wider than top section of outer shell 704 on which lid 770 may be situated but in other embodiments, the width of top section and base section of the outer shell 704 are equal to each other.

Inner shell 702 is configured to nest within outer shell 704 and the top section of inner shell 702 may be lower than the top surface 742 of outer shell 704. In some embodiments, inner shell 702 is configured to receive contents to be heated or cooled. Accordingly, contents may be poured directly into inner shell 702 and in other embodiments, contents are delivered in a separate contents container 710 according to design needs, wherein contents container 710 may be a conventional soup can, soda can, or any other container used to store foods, beverages, medications, or the like. For example, a user can take a warm can of juice (i.e. contents container 710) and insert the can 710 into inner shell 702, initiate an endothermic reaction, and shortly thereafter the can of juice is cooled and ready for consumption. In certain embodiments, a lid 770 is provided that is configured to secure outer shell 704 to inner shell 702 including any contents disposed therein such as a contents container 710. Lid 770 can be detachable by snapping on and off inner shell 702 and or outer shell 704 or alternatively by being peeled off.

In certain embodiments, reactant 750 is configured to be disposed underneath inner shell 702 in a space between the lower surface of inner shell 702 and the base 735. In some embodiments, the space between lower surface of inner shell 702 and the base 735 of outer shell 704 is concave, curved, or essentially planar. Activator container 720 is disposed inside device 700 between inner shell 702 and outer shell 704. Activator liquid 752 is disposed inside activator container 720. Activator container 720 can be constructed from plastic or paper fiber. Lid 770 may be constructed from a peelable layer such as foil to prevent contamination, tampering, and/or accidental activation. In certain embodiments, lower section 712 of activator container 720 is a foil lid that is bonded, glued, sonic welded, or otherwise adhered to activator container 720 and is configured to rupture easily by a piercer 715. In certain embodiments, there is a vent 765 at an opening in lid 770 from which steam produced in the temperature changing reaction can escape from device 700. Further, a plunger 714 may extend vertically between the top of inner shell 702 to the top surface 722 of activator container 720. In other embodiments, plunger 714 extends from the underside of lid 770 to the top surface 722 of activator container 720.

In some embodiments, plunger 714 is an elongated member configured to mechanically connect the upper surface 722 of activator container 720 to a vertical plane disposed between the underside of lid 770, the top section 742 of outer shell 704 and the top section of inner shell 702. In some embodiments, a user accesses plunger 714 by unpeeling, detaching or otherwise removing lid 770 in order to apply a downward force to the top of plunger 714. Plunger 714 can be fixed, integral with device 700, or detachable. In some embodiments, plunger 714 may never have any portion of its elongated member disposed above the top surface 742 of the outer shell 704 and/or the lid 770. Piercer 715 is disposed underneath activator container 720 and can be fixed, integral with device 700, or detachable. In some embodiments, piercer 715 can be cross-shaped or otherwise configured to rupture e.g. sharp or pointed) the lower surface of activator container 720 which may be a membrane.

Activation is caused when a user removes or unpeels lid 770 or otherwise accesses the top section of plunger 714 and applies pressure downward relative to the plunger 714 and the base 735. Sufficient pressure causes the activator container 720 to move towards the pierce 715. Piercer 715 then ruptures, breaks, or unseals the lower surface 712 of activator container 720 such that activator liquid 752 is caused to come into fluid communication with reactant 750 disposed in the reaction chamber 730. In certain embodiments, a gel is formed when reactant 750 combines with activator liquid 752. The gel swells up, and pushes into the external lower portion of the inner shell 702 and molds around the sides between inner shell 702 and outer shell 704.

Steam is produced from the gel and this steam forms a heating blanket around the inner shell 702 and exits the device 700 through the vent 765 disposed on the lid 770 or on the top surface 722 of outer shell 704. In other embodiments, the vent 765 is defined by the space between the plunger 714 and the region through which plunger 714 extends into the inner shell 702, lid 770, and/or top surface 722 of the outer shell 704. The diameter or size of vent 765 may be adjustable, either manually or automatically, so that the amount of steam and/or temperature of the contents inside inner shell 702 may be regulated. The vent 765 may be automatically adjustable by operatively connecting a bimetallic strip to the vent 765. In this embodiment, bimetallic strip is configured to regulate the heated or cooled temperature by governing the adjustable diameter of vent 765 and thus the amount of steam that escapes device 700.

In other embodiments, base 735 is detachable so that once reactant 750 is exhausted, it can be replaced. Similarly, activator container 720 may be replaceable once exhausted. Accordingly, device 700 is able to be used for more than one temperature changing reaction. Base 735 is detachable by snap on, screw on, or the like in order to easily fasten to outer shell 704 and/or inner shell 702. This offers the advantage of conserving materials and other resources.

In embodiments where the device 770 comprises contents container 710 such as a conventional food or beverage can and the lid 770 detaches by means of snapping on or off, the user pops the lid 770 and enjoys heated or cooled contents in the contents container 710. In embodiments where the reaction is exothermic and the inner shell 702 is constructed from metallic materials such as aluminum, because the top surface 742 of outer shell 704 is disposed above the inner shell 702 and/or contents container 710 and because outer shell 704 can be constructed from different material than inner shell 702 and/or contents container 710, the user's lip is protected from the heated metal of the contents container 710 by the outer shell 704 which offers the added benefit of ensuring user safety.

In any of the disclosed embodiments, it may be advantageous to dispose reactant in a permeable sachet or teabag disposed in reactant chamber. These advantages include that performance of the reactant is easily controlled in terms of duration and operating temperature ranges and thus resultant use by users is safe and predictable. Reactant may include any mixture of exothermic reactants, endothermic reactants or absorbent powders that form a gel when combined with a liquid. One suitable reactant mixture is an exothermic gel, such as Lava Gel® (Forever Young International Inc., Henderson, Nev.). Providing a reactant that forms a gel when mixed with a liquid activator such as water or an electrolyte solution is advantageous because the liquid is sequestered in a gel that cannot leak out of small venting apertures, thus eliminating the need for a complex valve mechanism that allows gas but not liquids to escape.

In some embodiments, the reaction chamber is detachable from the temperature changing device or container. Accordingly, when the reactant which is disposed in a sachet or other permeable containing mechanism and is exhausted following reaction, the user detaches the detachable reaction chamber, discards the exhausted reactant and can replace the exhausted reactant with fresh reactant. This offers the added benefit of being able to reuse temperature changing container and thus conserving materials and resources.

In any of the disclosed embodiments, a wide variety of materials may be used. The inner and outer shells may both be made from molded plastics such as polyethylene or polypropylene or other polymers. This construction provides relatively simple and inexpensive manufacturing so that the temperature changing container may be single-use or disposable. The inner shell may incorporate or be entirely made from a highly thermally conductive material such as aluminum to optimize heat transfer into the contents in the main container. In other embodiments, inner shell is constructed from conductive materials such as polymers designed to transfer heat conductive with an additive included in the resin. Additionally, some or all of the materials may be biodegradable such as polymers with additives, or other materials including fiber, paper, and other metals. Further, particularly where Lava Gel® is the reactant used, there is no danger of melting or damaging the container walls because the reacting chemicals do not attain dangerously high temperatures. Further, the heat of the exothermic reaction may continue for a relatively long time, from 15 minutes to an hour or more. Thus, not only do the contents stay warm or cooled for an extended period of time when compared to conventional known self-temperature changing devices, but the container itself could be used as a hand-warmer when using exothermic reactions simply by holding the container.

The disclosed embodiments may have a wide variety of shapes and sizes. For example, the containers may be generally round, but this is not a requirement, and rectangular or polygonal shapes are also contemplated. The dimensions may vary widely from only 1-2 inches in length and/or height to several feet in length and/or height, and any size in between.

It will be understood that many additional changes in the details, materials, steps and arrangement of parts, which have been herein described and illustrated to explain the nature of the concept, may be made by those skilled in the art within the principle and scope of the concept as expressed in the appended claims.

What is claimed is:

1. A temperature changing device, comprising:
    an inner shell having at least one wall, the inner shell configured to hold contents to be heated or cooled, wherein the at least one wall of the inner shell is thermally conductive; an activator container disposed adjacent to the inner shell, wherein the activator container comprises an activator liquid;
    an outer shell nested externally with the inner shell to form a reaction chamber between the activator container and the inner shell, wherein the reaction chamber comprises a reactant comprising a super absorbent powder that forms a swellable gel when activated; and
    a membrane sealing at least one opening between the activator container and the reaction chamber;
    wherein the activator container is opened to release the activator into the reaction chamber;
    wherein opening the membrane unseals the activator container causing the activator liquid to contact the reactant to initiate a temperature changing reaction that produces the swellable gel; wherein the swellable gel expands between the outer shell and the inner shell and the swellable gel produces steam causing heat to be transferred conductively and convectively to the contents disposed inside the inner shell; and
    wherein the steam escapes from the temperature changing device but the swellable gel does not escape therefrom.

2. The device according to claim 1, wherein all walls of the outer shell are thermally insulative.

3. The device according to claim 1, wherein the activator container and the inner shell are integrally formed together, the device further comprising an activation aperture with an activation tab extending therethrough, wherein the activation tab is mechanically connected to the membrane, and wherein pulling the activation tab opens the membrane and unseals the activator container.

4. The device according to claim 3, wherein the inner shell is comprised of two or more materials.

5. The device according to claim 3, wherein the activation aperture is also a vent to release steam generated in the temperature changing reaction.

6. The device according to claim 1, wherein the inner shell is configured to receive a contents container that comprises contents to be heated or cooled, wherein the contents container is inserted into an open upper end of the inner shell, and wherein the reaction chamber is disposed beneath the inner shell and the activator container.

7. The device according to claim 1, wherein the reactant is encased in a permeable sachet, and wherein the activator liquid is a liquid that wicks into the permeable sachet when the membrane is opened.

8. The device according to claim 1, the inner shell further comprising contents to be heated, wherein the reactant and the activator liquid undergo an exothermic reaction, and wherein heat generated by the exothermic reaction is transferred convectively and conductively to the contents of the inner shell thereby increasing the temperature of the contents.

9. The device according to claim 1, the inner shell further comprising contents to be heated, wherein the reactant and the activator liquid undergo an endothermic reaction, and wherein cold generated by the endothermic reaction is transferred convectively and conductively to the contents of the inner shell thereby decreasing the temperature of the contents.

10. The device according to claim 1,
    wherein the outer shell comprises an internal peripheral shoulder that forms the reactant chamber beneath the inner shell; and
    wherein the membrane is adhered to the internal peripheral shoulder of the outer shell causing the reactant chamber to hermetically seal.

11. The device according to claim 10, wherein the membrane further comprises a dump valve to facilitate opening the membrane.

12. The device according to claim 10, wherein the membrane further comprises a pre-weakened failure region, the device further comprising a pull tab having a first portion adhered to the membrane and a second portion extending out of the temperature changing device through an aperture, wherein pulling on the pull tab causes the membrane to fail in the pre-weakened failure region causing the membrane to open and unseal the reactant chamber to permit ingress of the activator liquid.

13. A temperature changing device, comprising:
    an inner shell having at least one wall, the inner shell configured to hold contents to be heated or cooled, wherein the at least one wall of the inner shell is thermally conductive; an activator container disposed adjacent to the inner shell, wherein the activator container comprises an activator liquid;
    an outer shell nested externally with the inner shell to form a reaction chamber between the activator container and the inner shell, wherein the reaction chamber comprises a reactant; and
    a membrane sealing at least one opening between the activator container and the reaction chamber;
    wherein the activator container is opened to release the activator into the reaction chamber;
    wherein opening the membrane unseals the activator container causing the activator liquid to contact the reactant to initiate a temperature changing reaction that produces a gel; wherein the gel expands between the outer shell and the inner shell and the gel produces steam causing heat to be transferred conductively and convectively to the contents disposed inside the inner shell;
    wherein the steam escapes from the temperature changing device but the gel does not escape therefrom;
    wherein the outer shell comprises an internal peripheral shoulder that forms the reactant chamber beneath the inner shell;
    wherein the membrane is adhered to the internal peripheral shoulder of the outer shell causing the reactant chamber to hermetically seal; and
    wherein the inner shell further comprises a lower end and a plunger disposed on the lower end, wherein the inner shell is vertically slidable relative to the outer shell, and wherein the device is activated by sliding the inner shell towards the outer shell causing the plunger to rupture the membrane in the pre-weakened failure region.

14. The device according to claim 13, further comprising:
    a first peripheral flange disposed on the inner shell;
    a second peripheral flange disposed on the outer shell; and
    a compressible gasket disposed between the first peripheral flange and the second peripheral flange;
    wherein sliding the inner shell towards the outer shell compresses the compressible gasket between the first peripheral flange and the second peripheral flange; and
    wherein compressing the compressible gasket causes the plunger to slide toward and rupture the membrane in the pre-weakened failure region.

15. The device according to claim 14, further comprising a removable locking member disposed between the first peripheral flange and the second peripheral flange that prevents vertical sliding of the inner shell toward the outer shell when the locking member is in place.

16. The device according to claim 15, wherein the compressible gasket has a cross-sectional profile that forms a channel, and wherein the locking member is engageable with the channel of the compressible gasket.

17. The device according to claim 16, further comprising a detachable lid, wherein the inner shell and the outer shell each comprise an associated top section, and wherein the detachable lid is configured to seal each of the associated top sections.

18. The device according to claim 17, further comprising an elongated member mechanically connected to the activator container and configured to extend until the top section of the inner shell; and a piercer disposed underneath the activator container, wherein the membrane that seals the at least one opening between the activator container and the reaction chamber is disposed underneath the activator container, and wherein the piercer is configured to pierce the membrane;
wherein applying downward pressure to the elongated member causes the piercer to piercer the membrane and open the activator container.

19. The device according to claim 18, further comprising a vent with a diameter is disposed on a top section of the outer shell, wherein the vent permits the steam that is generated by the gel to escape, and wherein the diameter of the vent is adjustable manually or automatically.

20. The device according to claim 18, further comprising a detachable base, wherein the inner shell and the outer shell each comprise an associated base section, and wherein the detachable base is configured to seal each of the associated base sections.

* * * * *